C. RODGER.
Cultivator.
No. 7,463.
Patented June 25, 1850.
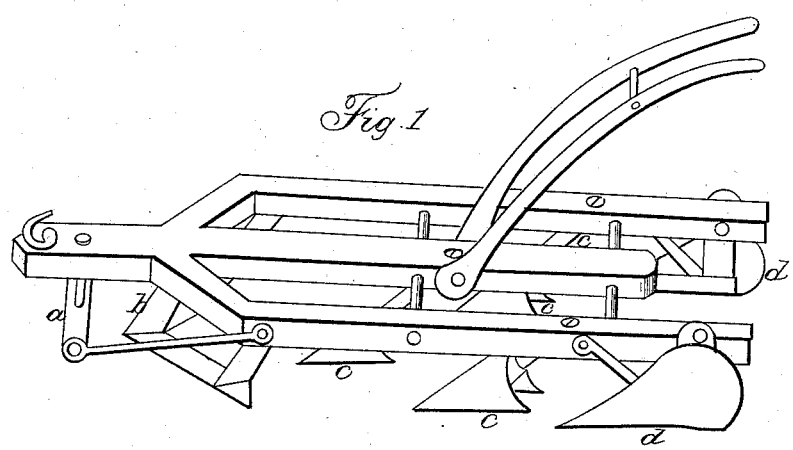
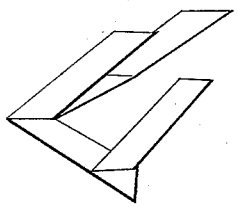
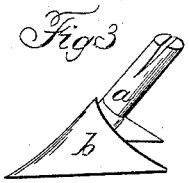

UNITED STATES PATENT OFFICE.

CHAS. RODGER, OF MONTPELIER, VERMONT.

IMPROVEMENT IN THE WEED-CUTTERS OF A CULTIVATOR.

Specification forming part of Letters Patent No. 7,463, dated June 25, 1850.

*To all whom it may concern:*

Be it known that I, CHARLES RODGER, of Montpelier, in the county of Washington and State of Vermont, have invented a new and useful Improvement on a Cultivator; and I do hereby declare that the following is a clear, full, and exact description of the construction and operation of the same, reference being had to the annexed drawings, making a part of this specification, in which—

Figure 1 is the perspective view; Fig. 2, the weed-cutter; Fig. 3, the foot of the cultivator.

In Fig. 1, $a$ represents a bar in front of the weed-cutter; $b$, the weed-cutter; $c$, the feet of the cultivator, and $d$ the side plow.

In Fig. 3, $a$ represents the leg, and $b$ the foot, of the cultivator.

The frame is made of scantling three by three inches for the outside bars and three by five inches for the inside bar. The bar in front, Fig. 1, $a$, is supported in the center and at the extremities by iron rods. The weed-cutter, Fig. 1, $b$, is made of steel or rod-iron of about three inches in width and one-fourth of an inch thickness. This piece of steel or iron is likewise supported in the center and at the extremities, Fig. 2, by pieces of steel or iron of an equal width and thickness, and is inserted in the frame at an angle of about forty-five degrees, facing with the sharpened edge. The cultivator-feet, Fig. 1, $c$, and Fig. 3, (three in number,) are composed of two distinct parts, Fig. 3, $a$, representing the leg, which is made of wood of an oval form, so as to unite the greatest strength with the least weight, and to prevent its turning either way it is held in its place by iron wedges, and can be removed for mending or sharpening the foot, Fig. 3, $b$, which is made of steel, rod or cast iron. These cultivator-feet are likewise inserted in the bars at an angle of about forty-five degrees. On the outside of the cultivator and near its ends small side plows are attached, and are supported by a piece of wood and an iron bar. They can be removed when their use is not needed. The whole is steered by handles attached to the center bar, similar to plow-handles.

It will be seen by the above description that, if a horse is attached to the cultivator and moves, the bar in front will press down the weeds before it and regulate the motion of the weed-cutter by preventing it from entering the soil too deep. The weed-cutter, Fig. 1, $b$, cuts the weeds under ground at the depth of two or three inches, thereby destroying them in the most effectual manner, since experience proves that the vital principle of a plant is injured the most when cut a little below the surface. The three cultivator-feet, Fig. 1, $c$, following the weed-cutter at a greater depth of about two or three inches, then destroy what is left of the roots, at the same time loosening the soil. The side plows, following, when attached to the cultivator, will throw up a drill and form square hills, if the land is cross-plowed.

The advantages of an implement of the above description in the raising of crops that are planted in hills or drills are evident, since it combines the action of the hoe, the cultivator, and the plow, leaving the land in a better condition than when cultivated with either, and it is even expected that this implement will effectually destroy Canada thistles and brakes. It is not only well adapted to be used during hoeing season, but at other times when it becomes necessary to destroy weeds. The saving of labor by it is very great, for a man, a boy, and a horse can perform as much work in a day by its use as twenty men—an important consideration at a time when weeds grow fast and labor often is scarce.

I do not claim the invention of a cultivator or any peculiar form of such, nor do I wish to confine myself to any particular form; but

I claim—

The combination of the bar $a$ with the weed-cutter $b$, in the manner and for the purpose set forth and represented.

CHARLES RODGER.

Witnesses:
JOHN S. BARKER,
S. B. COLLY.